May 6, 1952          R. W. LOWRY          2,595,864

DEMOUNTING ARRANGEMENT FOR TRACTOR MOUNTED EQUIPMENT

Filed Sept. 27, 1948          6 Sheets-Sheet 1

Robert W. Lowry
INVENTOR
BY *Cook and Schermerhorn*
ATTORNEYS

May 6, 1952   R. W. LOWRY   2,595,864
DEMOUNTING ARRANGEMENT FOR TRACTOR MOUNTED EQUIPMENT
Filed Sept. 27, 1948   6 Sheets-Sheet 2

Robert W. Lowry
INVENTOR
BY Cook and Schermerhorn
ATTORNEYS

May 6, 1952   R. W. LOWRY   2,595,864
DEMOUNTING ARRANGEMENT FOR TRACTOR MOUNTED EQUIPMENT
Filed Sept. 27, 1948   6 Sheets-Sheet 3

Robert W. Lowry
INVENTOR
BY Cook and Schermerhorn
ATTORNEYS

May 6, 1952     R. W. LOWRY     2,595,864
DEMOUNTING ARRANGEMENT FOR TRACTOR MOUNTED EQUIPMENT
Filed Sept. 27, 1948     6 Sheets-Sheet 6

INVENTOR
ROBERT W. LOWRY

Patented May 6, 1952

2,595,864

UNITED STATES PATENT OFFICE 2,595,864

DEMOUNTING ARRANGEMENT FOR TRACTOR MOUNTED EQUIPMENT

Robert W. Lowry, Portland, Oreg., assignor to Hyster Company, Portland, Oreg., a corporation of Oregon Application September 27, 1948, Serial No. 51,423

13 Claims. (Cl. 212—59)

This invention relates to a demounting arrangement for tractor mounted equipment and constitutes an improvement in equipment of the type disclosed and claimed in the copending application of Robert C. Shoemaker entitled Tractor Mounted Crane, Serial No. 626,115, filed November 1, 1945, and assigned to the assignee of the present invention.

The general object of the present invention is to provide a novel demounting arrangement for removing a whole crane, shovel or hoe structure from the tractor without dismantling, so that the complete structure may be parked as a unit to be available for easy remounting on the tractor. In the application above referred to, the tractor mounted equipment is exemplified by a crane having a mast and backstay system, a hoist unit with a revolving bull wheel, and a boom mounted on the bull wheel; and various procedures are disclosed for removing a part or all of the crane from the tractor to make the tractor available for the usual tractor work without being seriously encumbered by the crane structure. A procedure is disclosed for removing the boom and hoist unit so that these particular parts may be parked in an assembled condition while the tractor is being used for other work. In such case, in the prior disclosure, the mast and backstay assembly are left on the tractor. Another procedure may be followed according to the prior disclosure for removing all parts of the crane from the tractor, but in such case the crane is rather completely dismantled so that when it is again needed for crane work it must be reassembled on the tractor piece by piece.

A further object of the present invention is to provide an improved arrangement for holding the major parts of the tractor mounted equipment in assembled relation after their removal from the tractor, so that when the removal of the equipment is only temporary substantially no dismantling of the equipment will be required to separate it quickly from the tractor. Another object is to provide an improved construction and arrangement to support the mast and backstay system temporarily on the hoist unit and boom when the crane is parked so that the rigging will not have to be disturbed in removing the structure from the tractor, and so that by making a few simple connections the completely rigged structure may easily be remounted on the tractor. Another object is to provide a novel mounting and arrangement for supporting the mast and backstay system in an inclined position on the hoist unit with the center of gravity of the mast and backstay system in a position to provide stable equilibrium while the assembly is resting on the ground, detached from the tractor. Another object is to provide a novel adjustable coupling means to transfer support of the mast from the tractor to the hoist unit so that both the mast and hoist unit may be removed as one unit from their mounting brackets on the tractor.

These and other objects will become apparent as the description proceeds in connection with the accompanying drawings illustrating preferred embodiments of the invention.

Figure 1:
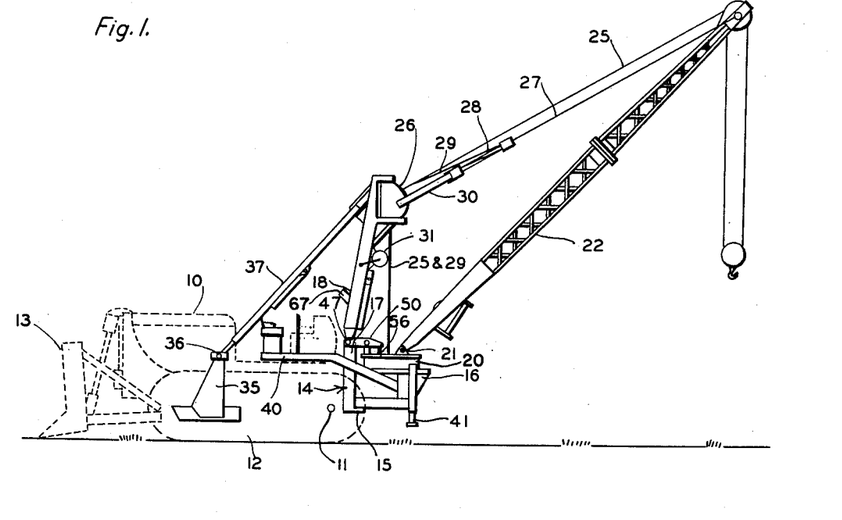
Figure 1 illustrates a tractor mounted crane embodying the present invention rigged for crane work.

Figure 1 shows a crane of the type disclosed in the above mentioned prior application mounted on a crawler type tractor for crane work. In order to describe the structure and mode of operation of the present invention, it will first be necessary to describe the general features of the structure of the prior application to which the present invention is applied. The tractor comprises a body 10 mounted at its rear end on a rigid axle 11 interconnecting and driving a pair of crawler traction units 12 on opposite sides of the body. On such tractors the front end of the body is ordinarily resiliently mounted on a transverse leaf spring flexibly interconnecting the front ends of the traction units to permit independent up and down movement. Such tractors are also usually provided with a heavy bulldozer blade 13 extending out in front of the tractor body and mounted on the crawler traction units rather than on the body. The bulldozer blade provides an effective counterweight for the crane, and, if the tractor is not equipped with a bulldozer, or if the bulldozer is not heavy enough, suitable racks are provided on the front ends of the crawler traction units to hold heavy weights to counterbalance the crane.

On the rear of the tractor body are attached bracket structures 14 having a bottom ledge or shelf 15 to support a hoist unit 16 and having a pair of upstanding arms 17 on opposite sides of the tractor body to pivotally support the two legs of an A-frame crane mast 18. The hoist unit 16 contains a number of winches driven by a power take-off from the tractor engine for operating the crane. A gear drive is provided for these winches so that when the hoist unit 16 is mounted on the bracket structure 14 a driven gear in the hoist unit is brought into mesh with a driving gear on the power take-off of the tractor. When the hoist unit is removed from the tractor, these gears are automatically disengaged and separated without any special disconnecting operation.

The hoist unit 16 is surmounted by a revolving bull wheel 20 having a pivotal mounting or heel pin 21 for the heel end of the boom 22. In the usual rigging for crane work the boom carries a hoist line 25 passing through a freely rotatable masthead fair-lead 26, and thence descending vertically through a central cable opening in the bull wheel to the hoisting winch in the hoist unit 16. The boom is supported by a boom suspension link 27 connected with a pulley block arrangement 28 having a boom suspension line 29 which also passes through the fair-lead 26 and then descends vertically alongside the hoist line 25 to a boom suspension winch in the hoist unit 16. The masthead fair-lead 26 is turned in the direction of the boom by a pair of links 30 connected with the pulley block assembly 28, so that these links are always tensioned by the weight of the boom. The hoist unit 16 also contains a power driven gear for rotating the bull wheel to swing the boom and, as the boom swings, the links 30 swing the fair-lead 26 to conform to the lead of the cables. The mast 18 also carries a hand winch 31. This crane construction is also suitable for other related operations such as clam shell bucket excavation and dragline scraper excavation, and modifications will be described for hoe and shovel work.

The forward end of the frame of each crawler traction unit is provided with an upstanding bracket 35 having a pin or socket connector 36 for attachment with the end of a rigid backstay strut 37. The upper ends of these struts converge toward the masthead and are connected therewith through an articulating equalizing device forming no part of the present invention. The equalizing device, however, is arranged so that it may be locked in a fixed position or unlocked. When unlocked, it permits up and down movements of the front ends of the crawler traction units relative to each other and to the front end of the tractor body through the usual front end spring suspension of the tractor to utilize the advantages of the flexible tractor suspension when the crane is to be moved from place to place over rough ground. When the crane is in operation, the masthead equalizer device is locked in a fixed position so that the struts 37 form a rigid non-articulating backstay system which is effective in compression as well as in tension to anchor the masthead to the forward ends of the crawler traction units, thereby to utilize the weight not only of these traction units but also of the forwardly extending heavy bulldozer blade 13 to counterbalance the crane. When the equalizer is thus locked for crane operation, the traction units are thereby made rigid with the mast but the front end of the tractor body is still resiliently supported on its front spring to act as a shock absorber for the body and engine in crane work. If the tractor is not equipped with a heavy bulldozer blade, counterweights on the traction units serve the same purpose to prevent overturning of the crane. The crane is controlled from an operator's platform 40 mounted on the hoist unit 16 and extending out over the track of one of the traction units to provide the operator with good visibility in any position of the boom. The hoist unit is also provided with a pair of jack legs 41 which may be extended downwardly to support the crane structure on the ground during and after its removal from the tractor.

The crane construction thus far described is described and claimed in the copending application above referred to. An important advantage of this construction is that it may be either completely mounted or demounted from the tractor in the field, piece by piece, without the aid of auxiliary mechanical equipment to handle the heavy parts which cannot be manually lifted. Another advantage of the construction thus far described is that the hoist unit, boom and operator's platform may be removed as a unit as described in detail in the copending application. The removal of the hoist unit and boom, however, in the prior disclosure, requires the removal of the rigging from the masthead fair-lead, and leaves the mast and backstay assembly mounted on the tractor where it is sometimes of inconvenience in the use of the tractor in other tractor work. In accordance with the objects of the present invention, novel coupling means are provided in addition to the parts already described to connect the mast and backstay system with the boom and hoist unit so that the whole crane structure may be removed substantially as a unit without dismantling, and parked on the ground in this condition to make the tractor temporarily available for other tractor work without the hindrance of any major parts of the crane remaining on the tractor. Removal of the crane in this new manner, which will presently be described, saves much time in demounting and remounting the crane because it does not require the removal of any of the rigging and because the various parts are held substantially in their erected position while the structure is parked. This manner of demounting enables the tractor to be backed up to the crane and the latter to be remounted on the tractor with a minimum amount of work in reconnecting various pin connected parts and tightening certain bolt connections. It is to be understood that the present invention provides an additional manner of demounting and parking the crane equipment and that it does not interfere with the primary erection and dismantling procedure described in detail in the copending application.

Figures 5, 6, 11:
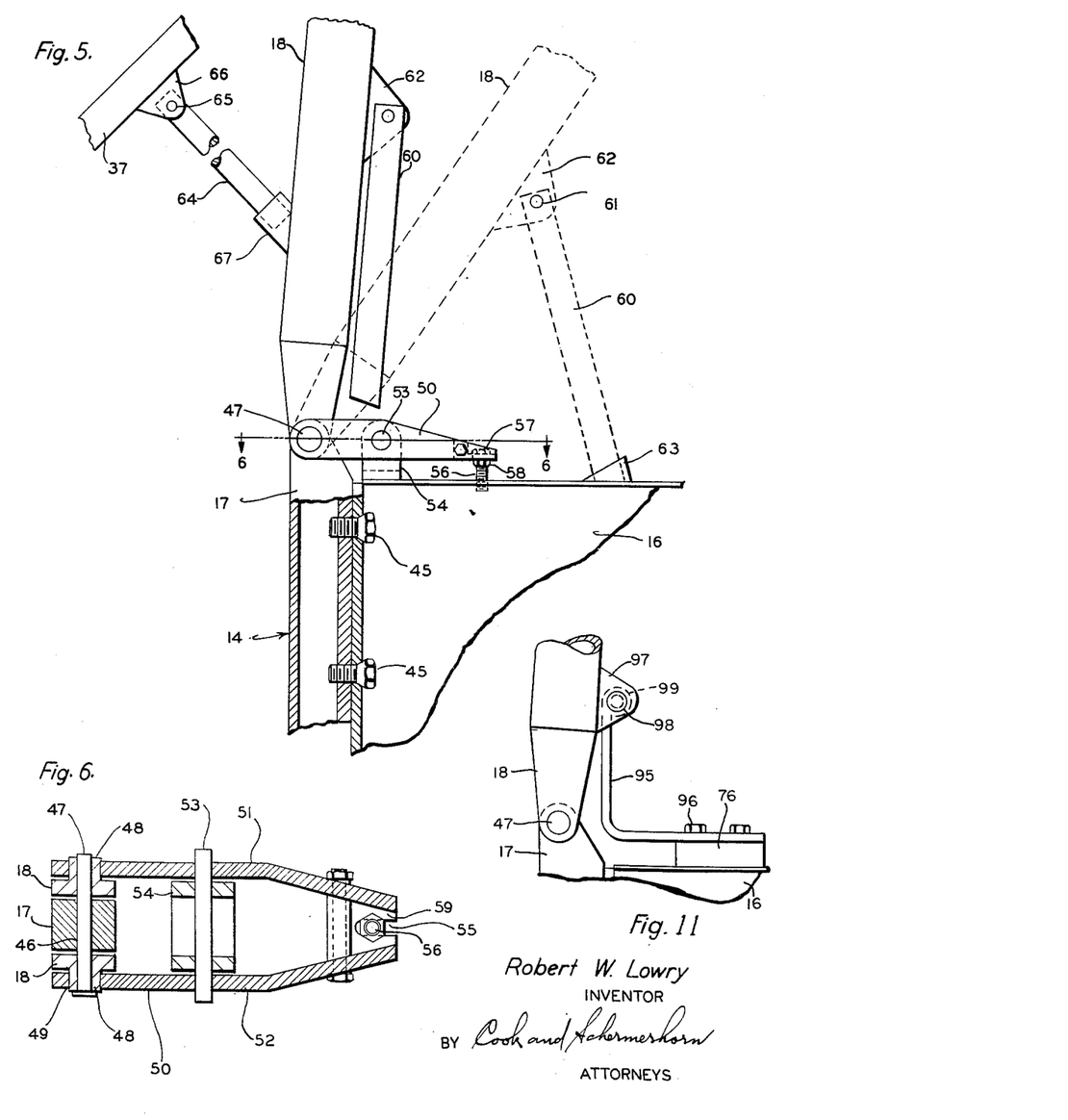
Figure 5 is a fragmentary side elevation view of the mast and hoist unit showing one form of coupling means for supporting the mast on the hoist unit.
Figure 6 is a sectional view of the coupling means taken on the line 6—6 of Figure 5.
Figure 11 is a fragmentary side elevation view of still another form of coupling means for supporting the mast on the hoist unit.

The parts which have been added to make the crane, or other equipment, removable as a complete unit are shown on an enlarged scale in Figures 5 and 6. The numeral 45 designates heavy cap screws used to secure the hoist unit 16 to the bracket structures 14 on the back of the tractor. The upper extremity of each arm 17 is apertured at 46 to receive a heel pin 47 providing pivotal support for one leg of the A-frame mast 18. The lower end of each leg of the mast is bifurcated to straddle the bracket arm 17 and apertured to receive the pin 47, whereby the mast is capable of relative oscillatory movement about the pins 47 to accommodate vertical movements of the front end of the tractor body on the resilient front spring when the crane is in operation. When the backstay struts 37 are disconnected for demounting or dismantling purposes, the mast may be tilted rearwardly on the pins 47.

A pair of outwardly directed trunnions 48 are provided on the bifurcated lower end of each mast leg concentric with the pin 47, which trunnions are received in circular openings 49 constituting bearings in a coupling member or lever 50. The coupling member 50 comprises a pair of spaced parallel arms 51 and 52 pivotally mounted on a pin 53 in an upstanding bracket 54 secured to the top of the hoist unit 16. The other end of the coupling lever 50 is provided with a horizontal flat plate 59 between the arms 51 and 52 of the lever, this plate having a slot 55 to receive a stud bolt 56 which is also secured in the upper side of the hoist unit 16. A pair of nuts 57 and 58 on the bolt 56 provide a vertical height adjustment for the extremity of the lever 50 to align the axis of trunnions 48 with the center of the hole 46 in each mounting bracket. By turning the nuts 57 and 58 up or down, the support of each mast leg may be transferred to its bracket arm 17 or to the hoist unit, as desired, in mounting or demounting the equipment. The coupling levers 50 associated with the two mounting bracket arms 17 are thus capable of supporting the mast legs on the hoist unit so that the pins 47 may be removed. This enables the mast and backstay system to be removed from the tractor along with the hoist unit, whereas, in the original construction without the coupling levers 50, as disclosed in the copending application, there was no connection between the mast and the hoist unit after the latter was removed from the tractor.

The mast cannot be supported directly on the hoist unit during crane operation because the hoist unit frame and cap screws 45 would be overstressed and the overturning moments on the tractor would be increased. For crane work the mast load must be supported directly on the bracket structures 14, 17. The coupling levers 50 do not carry the mast load when the crane is erected but merely constitute means for transferring the mast from the arms 17 to the hoist unit for demounting and parking purposes. The coupling levers 50 may be referred to as an auxiliary mast support to distinguish from the main mast support 17.

Each leg of the mast is also provided with a brace 60 pivotally mounted at 61 on a bracket 62 so that when the mast is inclined rearwardly the lower end of this brace may be seated in a socket 63 on the hoist unit 16. In a similar manner a prop 64 is pivotally mounted at 65 on a bracket 66 on each of the struts 37 so that it may be swung out to seat in a socket 67 on the mast leg to support the backstay struts when the mast is inclined rearwardly.

Figure 2:
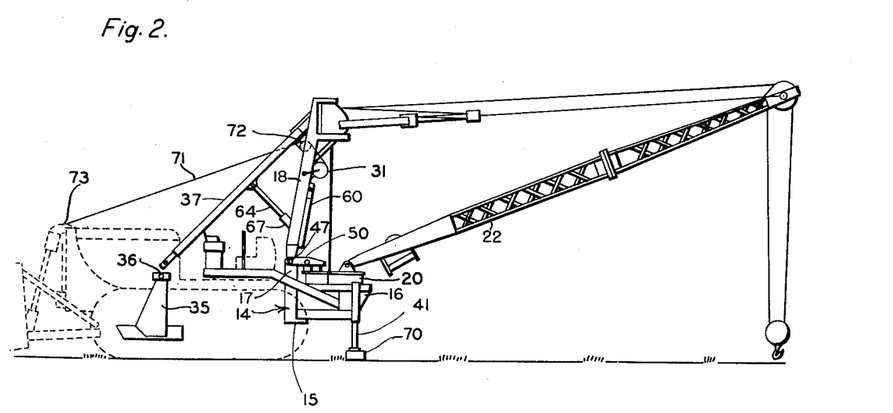
Figure 2 illustrates a first step in removing the crane from the tractor.
Figure 3:
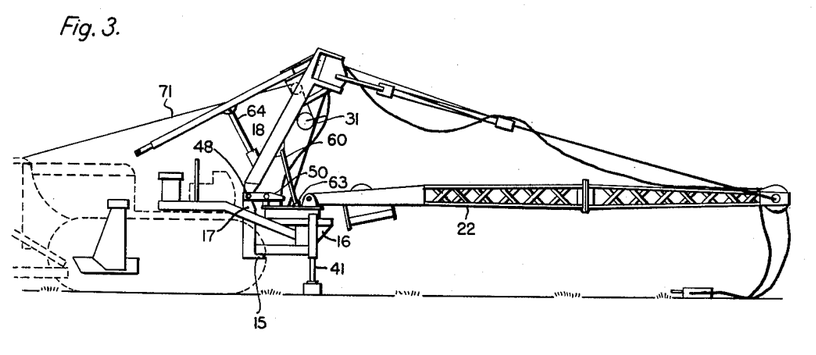
Figure 3 illustrates a second step in removing the crane from the tractor.
Figure 4:
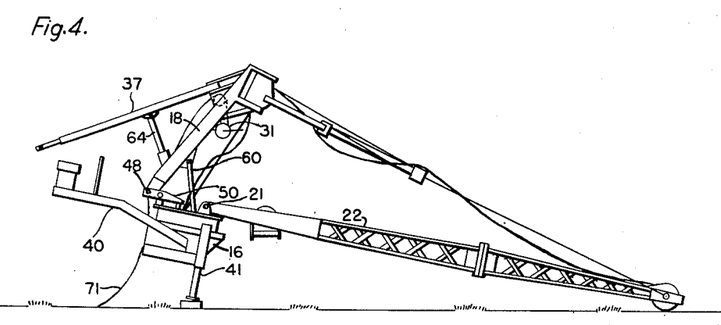
Figure 4 shows the crane entirely removed from the tractor and parked on the ground in a condition to be easily remounted on the tractor.

The sequence of operations to be performed in demounting the crane from the tractor without dismantling is illustrated in Figures 2 to 4. The first steps in this operation are to lower the boom to the approximate angle shown in Figure 2 and extend the jack legs 41 down to rest upon a timber 70 or other fairly solid support. The cap screws 45 which hold the hoist unit to the bracket structures 14 may then be removed to leave the hoist unit supported on the jack legs 41 and the bracket shelf 15 so that it cannot drop out of position away from the tractor. A line 71 from the hand winch 31 is then passed over a sheave 72 in the masthead and anchored at 73 to the front of the tractor body. Upon tightening of this line by the hand winch the tension may be removed from the struts 37 and the pin connectors 36 withdrawn from the track brackets 35. The struts thus released are supported on the mast by placing the lower ends of the props 64 in the socket 67. When this is accomplished the various parts are in the positions shown in Figure 2.

The coupling levers 50 are then adjusted by turning the nuts 57 and 58 on the studs 56 to transfer the mast load from the pins 47 to the trunnions 48. The pins 47 are then removed and the hand winch 31 unwound to lower the mast to a rear inclining position over the hoist unit. The mast is gradually lowered in this manner until the braces 60 are seated in the sockets 63. When the mast reaches this position, as shown in Figure 3, the boom should be approximately horizontal and either resting on or about to rest on the rear edge of the bull wheel.

Then, as the unwinding of the hand winch 31 continues, the hoist unit, boom and mast all revolve as a unit about a center at the lower ends of the jack legs until the end of the boom rests upon the ground. As the parts thus rotate in a clockwise direction about the point of support for the jack legs, the front side of the hoist unit which has been attached to the tractor rises off the mounting bracket ledge 15 and similarly the control platform 40 and backstay struts 37 are raised to clear the tractor so that the latter may be driven away. The crane is thereby left parked in the position shown in Figure 4, standing as a tripod on the two jack legs 41 and the boom tip. The length of the braces 60 is such that the heavy masthead projects somewhat to the rear of the jack leg support so that the assembly will rest in stable equilibrium. The tractor is thus relieved of all parts of the crane except the rear bracket structures 14, the track brackets 35, and the transmission which interfere in no way with most uses to which the tractor may be put.

Since it is not necessary to disturb the rigging or to remove any parts of the crane structure individually, the above described demounting operation may be performed very easily and quickly to afford the tractor a true dual utility which is not attainable with conventional tractor mounted cranes.

When the crane is to be remounted on the tractor it is only necessary to back the tractor into the position in which it left the crane and reverse the sequence of demounting operations described hereinabove. The tractor is backed up until the mounting bracket shelf 15 extends under the front edge of the hoist unit and the line 71 is attached to the front of the tractor. Then, by tightening the hand winch 31, the crane structure is rotated as a unit on its jack leg support to lift the boom up to a horizontal position and bring the hoist unit into position for replacement of the bolts or screws 45 to secure the hoist unit to the mounting bracket. This places the parts in the positions shown in Figure 3, and the nuts 57 and 58 may be adjusted if necessary to permit the insertion of the mast heel pins 47. Finally, after continued tightening of the line 71, to erect the mast, the pins 36 for the lower ends of the backstay struts 37 may be inserted in the traction unit brackets 35.

The remounting operation is thus accomplished easily and quickly without the direct lifting of any parts of the structure. A rather large crane structure may be easily handled in this manner, since the only force required is easily developed by the hand winch 31 to rock the structure about its center of support on the jack legs. The general form of crane construction and mode of mounting and demounting may also be applied to tractors and other vehicles differing in some respects from the particular type of tractor herein described.

Figure 7:
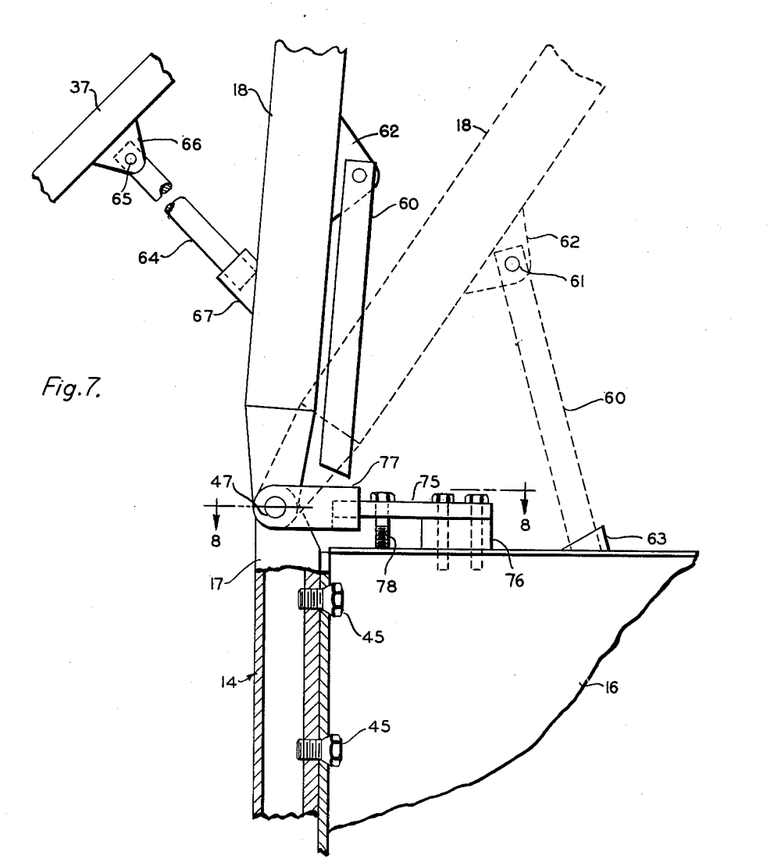
Figure 7 is a fragmentary side elevation view showing another form of coupling means for supporting the mast on the hoist unit.
Figure 8:
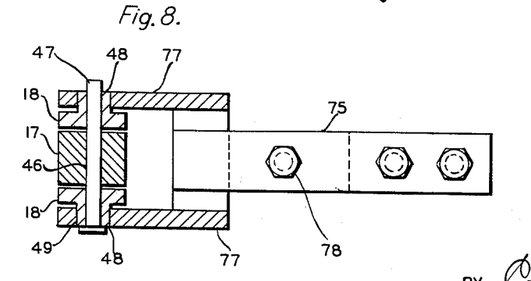
Figure 8 is a sectional view of the coupling means taken on the line 8—8 of Figure 7.

Figures 7 and 8 show a modified form of coupling member 75. The coupling member 75 is mounted at one end as a cantilever spring on a block 76 on top of the hoist unit 16. The free end of the spring coupling member 75 has two arms 77 provided with bearings for the trunnions 48 in the manner of the arms 51 and 52 on the coupling member 50 in Figures 5 and 6, it being understood that there is a coupling member 75 associated with each of the two upstanding bracket arms 17 and A-frame mast legs. The two spring members 75 are designed to support the mast with its rigging and backstay struts on the hoist unit 16 for the purposes of demounting and parking the crane but, for reasons hereinabove pointed out, these members are not intended to furnish sole support for the mast while the crane is in operation. By adjusting the screws 78, the arms 77 may be raised or lowered sufficiently to transfer the mast load from the bracket arms 17 to the coupling member 75 to permit withdrawal of the pins 47, this operation being accomplished in the course of the demounting procedure hereinabove described with reference to Figures 1 to 6, to park the crane on the ground as a complete unit.

In remounting the crane on the tractor, the screws 78 may again be adjusted if necessary to register the centers of trunnions 48 with the holes 46 in the bracket arms for reinsertion of the heel pins 47. After the heel pins are inserted, any load on the mast produced by operation of the crane is transmitted directly to the bracket arms 17 on the back of the tractor and not to the hoist unit. By designing the spring members 75 to just support the weight of the mast in its proper position with its rigging and backstay system, relatively little effort is required to turn the adjusting screws 78.

When it is desired to remove the hoist unit from the tractor without removing the mast, according to the primary dismantling procedure described in the copending application or for any other purpose, the coupling members 50 or 75 may be easily disconnected to make the hoist unit entirely free of the mast. The present invention imposes no restriction on any function or procedure heretofore disclosed but provides advantages in addition to those heretofore disclosed.

Figure 9:
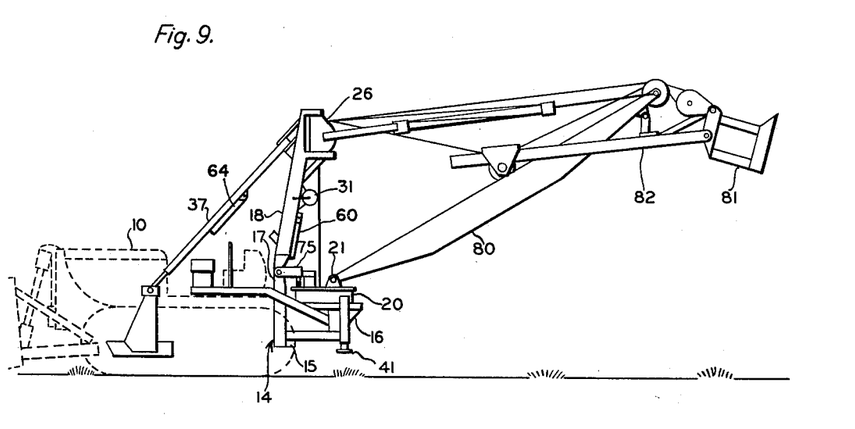
Figure 9 shows a tractor mounted shovel embodying the principles of the invention.
Figure 10:
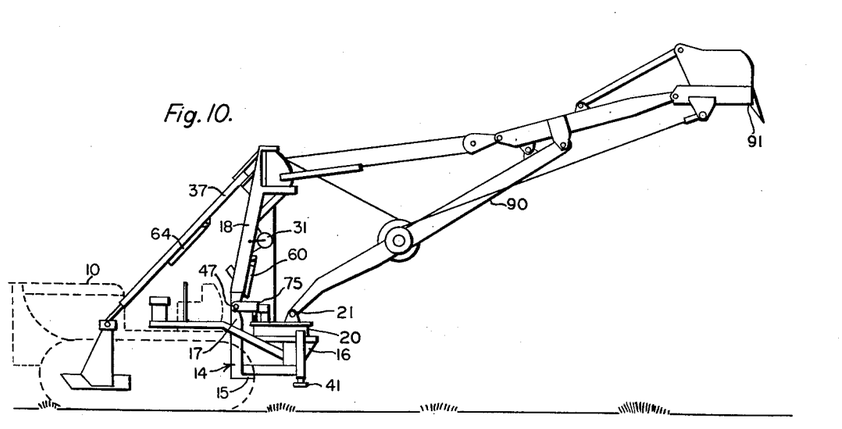
Figure 10 shows a tractor mounted hoe embodying the principles of the invention.
Figure 12:
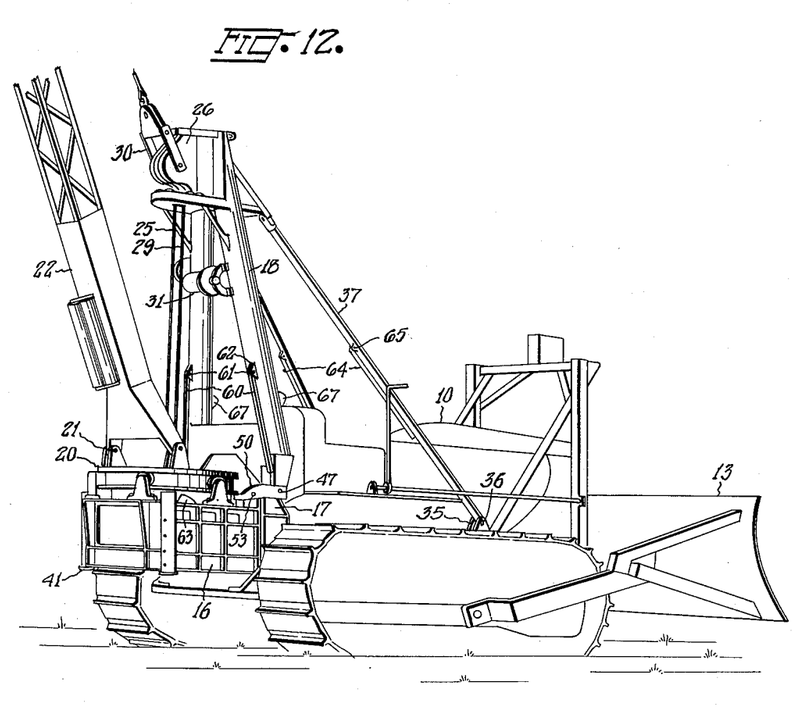
Figure 12 is a rear perspective view on an enlarged scale of the tractor mounted crane shown in Figure 1.

Figures 9 and 10 illustrate how the present invention may be applied to a tractor mounted shovel and tractor mounted hoe. In Figure 9, the shovel boom 80 is mounted on heel pins 21 on the same bull wheel 20 and hoist unit 16 shown in Figure 1. The shovel dipper 81 is carried by a dipper stick 82 running through the boom 80 in the usual manner, and the various cables for manipulating the shovel are trained through the masthead fair-lead 26 for connection with drums in the hoist unit as in the case of the crane.

In Figure 10 a hoe boom 90 is mounted on the heel pins 21 on the bull wheel 20 for operation of the hoe dipper 91. The operation of the various cables and levers in the hoe will be apparent to persons skilled in the art, the cables being trained through the masthead fair-lead for connection with cable drums in the hoist unit as in the case of the crane and shovel.

In both the shovel and hoe shown in Figures 9 and 10, parts which have already been described in connection with the crane are again given the same reference numerals, and it is understood that the mounting and demounting procedure for the shovel and hoe are the same as the procedures described in detail for the crane. The same mounting bracket structures, hoist unit and mast are used for the crane, shovel and hoe, the primary difference between these various kinds of tractor mounted equipment residing in the form of the boom and associated parts. Whereas the crane is parked with the boom tip resting directly on the ground, the shovel and hoe may be parked with the dipper resting on the ground and the boom tip supported by the dipper. It will be apparent that the present invention has equal application to these and other classes of tractor mounted equipment having some type of boom to be mounted on the bull wheel 20 and supported by the mast 18 and backstay system 37. It has already been pointed out that the coupling member 75 may be used in place of the coupling member 50 on the crane, and it is also to be understood that the coupling lever 50 may be substituted for the coupling member 75 on the shovel or hoe or other similar equipment.

Figure 11 shows another form of coupling member which may be applied to any of the hereinabove described types of tractor mounted equipment. In this case, the coupling member comprises an L-shaped cantilever spring member 95 having one end rigidly secured by bolts 96 on the top surface of a block 76 on the hoist unit 16. There is a cantilever spring coupling member 95 thus secured to the hoist unit adjacent each of the legs 18 of the A-frame mast and each mast leg carries a pair of spaced ears 97 having aligned openings to receive a pin 98 through an eye or bearing 99 in the upright end of the coupling member 95.

The pins 98 may be left in place while the tractor mounted equipment is in use, since any working load on the mast is carried directly by heel pins 47 and bracket members 17. The L-shape of spring member 95 allows its bearing 99 to move both horizontally and vertically to accommodate small movements of the mast on its heel pins 47 in response to flexing of the tractor spring. When it is desired to remove the mast from the tractor, and support it on the hoist unit, as shown in Figure 4, or for any other purpose, it is only necessary to remove the heel pins 47. The mast is then supported by pins 98 on the resilient coupling members 95 and while thus supported it may be tilted back on its props 60, as previously described in connection with the other types of coupling members. The equipment may not only be parked on the jack legs 41 as shown, but, by providing a two-wheeled dolly under the hoist unit, it may be towed by the boom, as a trailer, in substantially fully rigged condition. The embodiment of Figure 11 has the advantage of providing for easy disconnection of the coupling members from the mast by merely withdrawing the pins 98, and the further advantage of utilizing the ears 97 to support the mast on the coupling members without requiring the specially formed trunnions 48 on the mast, shown in Figures 6 and 8.

Various other changes may be made in the details and arrangement of parts as will occur to persons skilled in the art, and all such modifications within the scope of the appended claims are included in the invention.

Having now described my invention and in what manner the same may be used, what I claim as new and desire to protect by Letters Patent is:

1. In tractor mounted equipment, a mast, a mast support on the tractor, a detachable connection between said mast and support, a hoist unit mounted on the tractor adjacent said mast support, and a mast support on said hoist unit connected with said mast for supporting said mast conjointly with said mast support on the tractor when said detachable connection is established and providing the entire support for said mast when said connection is detached.

2. In tractor mounted equipment, a mast, a main pivotal support for the mast on the tractor, a hoist unit removably mounted on the tractor adjacent said support, a coupling member on said hoist unit, an auxiliary pivotal mast support mounted on said coupling member to accommodate pivotal movement of the mast on said main support, and a detachable connection between the mast and said main support for demounting the mast with the hoist unit.

3. In tractor mounted equipment, a mast, a mast support on the tractor, a detachable connection between said mast and support, a hoist unit removably mounted on the tractor adjacent said mast support, an auxiliary mast support on said hoist unit, and a pivotal connection between said auxiliary support and the lower end of the mast to support the mast on the hoist unit for demounting the hoist unit and mast from the tractor.

4. In tractor mounted equipment, a mast, a mast support on the tractor, said mast and mast support having pin connector openings, a removable pin connector for said openings, a hoist unit removably mounted on the tractor adjacent said mast support, an auxiliary mast support, and means mounting said auxiliary mast support on said hoist unit for vertical adjustment to register said openings for insertion and removal of said pin connector when the hoist unit is in mounting position on the tractor.

5. In tractor mounted equipment having a mast pivotally mounted on the tractor and a hoist unit mounted on the tractor independently of said mast, means on said hoist unit to provide conjoint pivotal support for said mast in cooperation with the pivotal mast support on said tractor, and means for adjusting said first means vertically to transfer the load of said mast from said tractor to said hoist unit so that said mast and hoist unit may be removed from the tractor as a unitary assembly.

6. In tractor mounted equipment having a hoist unit with jack legs and a boom adapted to form a tripod support on the ground when said hoist unit is removed from the tractor, and having a mast mounted on the tractor adjacent said hoist unit; a coupling member on the hoist unit pivotally connected with the lower end of the mast to support said mast on said hoist unit for removal of the equipment from said tractor in fully rigged condition.

7. In tractor mounted equipment having a mast and hoist unit independently mounted on the tractor and having backstay struts connected at their upper ends with said mast, a coupling member on the hoist unit pivotally connected with the lower end of the mast for supporting said mast on said hoist unit, and props engaging said backstay struts and mast for supporting the lower ends of said backstay struts on said mast so that said mast and backstay system may be removed from said tractor along with said hoist unit.

8. In tractor mounted equipment, a mast, a mast support on the tractor, a hoist unit removably mounted on the tractor adjacent said mast support, means on the hoist unit for supporting the hoist unit on the ground in position for mounting the tractor, an auxiliary mast support on the hoist unit connected with the lower end of the mast, and a prop engaging the hoist unit and mast for supporting the upper end of the mast on the hoist unit when the mast and hoist unit are demounted from the tractor.

9. In tractor mounted equipment having a mast and backstay struts removably mounted on the tractor, a hoist unit removably mounted on the tractor adjacent said mast, means on the hoist unit for supporting the hoist unit on the ground in position for mounting on the tractor, an auxiliary pivotal mast support on said hoist unit, props for engaging said hoist unit and mast at a distance from said pivotal support, and props engaging said backstay struts and mast for supporting said backstay struts on said mast.

10. In tractor mounted equipment, a mast, a mast support on the tractor, a pin connector for mounting said mast on said support, trunnions on said mast concentric with said pin connector, a hoist unit mounted on the tractor adjacent said mast support, and an auxiliary support on said hoist unit engaging said trunnions to support the mast on the hoist unit when said pin connector is withdrawn.

11. In tractor mounted equipment, a mast support on the tractor, a mast having a pin connector to connect the mast on said support, trunnions on said mast concentric with said pin connector, a hoist unit mounted on the tractor adjacent said mast support, a coupling member mounted on said hoist unit for vertical adjustment, and bearings on said coupling member engaging said trunnions for supporting said mast on the hoist unit independently of said pin connector.

12. In tractor mounted equipment, a mast support on the tractor, a mast on said support, a hoist unit mounted on said tractor adjacent said support, a resilient coupling member on said hoist unit, and an auxiliary mast support on said coupling member connected with said mast.

13. In tractor mounted equipment, a mast, a mast support on the tractor, a pivotal connection between said mast and support, a hoist unit mounted on the tractor adjacent said support, and a resilient auxiliary mast support on said hoist unit pivotally connected with the lower end of said mast.

ROBERT W. LOWRY.

REFERENCES CITED

The following references are of record in the file of this patent:

UNITED STATES PATENTS

| Number | Name | Date |
|---|---|---|
| 791,151 | King et al. | May 30, 1905 |
| 882,086 | Webber | Mar. 17, 1908 |
| 1,898,453 | Lehman et al. | Feb. 21, 1933 |
| 2,259,966 | Tappe | Oct. 21, 1941 |
| 2,362,220 | Shoemaker | Nov. 7, 1944 |